(12) United States Patent
Kwon et al.

(10) Patent No.: US 9,791,335 B2
(45) Date of Patent: Oct. 17, 2017

(54) FBG SENSOR FOR MEASURING MAXIMUM STRAIN, MANUFACTURING METHOD AND USING METHOD

(71) Applicant: KOREA RESEARCH INSTITUTE OF STANDARDS AND SCIENCE, Daejeon (FR)

(72) Inventors: Il-Bum Kwon, Daejeon (KR); Joo Eun Im, Daejeon (KR); Mi Hyun Kim, Daejeon (KR); Ki Sun Choi, Gwangju (KR)

(73) Assignee: KOREA RESEARCH INSTITUTE OF STANDARDS AND SCIENCE (KR)

( * ) Notice: Subject to any disclaimer, the term of this patent is extended or adjusted under 35 U.S.C. 154(b) by 0 days.

(21) Appl. No.: 15/025,334

(22) PCT Filed: Sep. 30, 2014

(86) PCT No.: PCT/KR2014/009159
§ 371 (c)(1),
(2) Date: Mar. 28, 2016

(87) PCT Pub. No.: WO2015/050355
PCT Pub. Date: Apr. 9, 2015

(65) Prior Publication Data
US 2016/0216166 A1     Jul. 28, 2016

(30) Foreign Application Priority Data

Oct. 1, 2013  (KR) .................. 10-2013-0117106

(51) Int. Cl.
*G01B 11/16* (2006.01)
*G01L 1/24* (2006.01)
(Continued)

(52) U.S. Cl.
CPC .............. *G01L 1/246* (2013.01); *G01B 1/00* (2013.01); *G01B 11/16* (2013.01); *G01B 11/165* (2013.01); *G01B 11/18* (2013.01); *G01D 5/353* (2013.01)

(58) Field of Classification Search
CPC ...................................... G01B 11/16
(Continued)

(56) References Cited

U.S. PATENT DOCUMENTS

| | | | | |
|---|---|---|---|---|
| 2009/0126501 A1* | 5/2009 | Ferguson | ............... | G01B 11/18 73/800 |
| 2010/0021106 A1* | 1/2010 | Tam | ................... | G01D 5/35303 385/13 |
| 2014/0311250 A1* | 10/2014 | Maul | ..................... | G01B 11/18 73/800 |

FOREIGN PATENT DOCUMENTS

| | | |
|---|---|---|
| JP | 2001296110 | 10/2001 |
| JP | 2003130934 | 5/2003 |

(Continued)

OTHER PUBLICATIONS

Sang-Woo Kim et al, "Determination of the maximum strains experienced by composite structures using metal coated optical fiber sensors," Composites Science Technology, vol. 78, Apr. 1, 2013, pp. 48-55.

*Primary Examiner* — Roy M Punnoose
(74) *Attorney, Agent, or Firm* — Allen, Dyer, Doppelt, Gilchrist, P.A.

(57) ABSTRACT

The present invention relates to an FBG sensor for measuring a maximum strain of an object being measured, a method for manufacturing the sensor, and a method of using the sensor. To this end, provided is the FBG sensor for measuring a maximum strain, comprising: an optical fiber (130) having an FBG sensor (150) therein; a first metallic foil (120) contacting the optical fiber (130) on one surface (Continued)

thereof; a second metallic foil (120) which comes into surface-contact with the one surface; an adhesive layer (140) provided between the first and second metallic foils (100, 120); a means for measuring a residual strain of the first and second metallic foils (100, 120) through the FBG sensor (150); and a means for calculating a maximum strain on the basis of the measured residual strain and a sensitivity coefficient (Csen) obtained through experimentation.

10 Claims, 11 Drawing Sheets

(51) Int. Cl.
    *G01B 1/00*     (2006.01)
    *G01D 5/353*     (2006.01)

(58) Field of Classification Search
    USPC .......................................... 356/32
    See application file for complete search history.

(56) References Cited

FOREIGN PATENT DOCUMENTS

| | | |
|---|---|---|
| JP | 2003130934 A | 5/2003 |
| JP | 2003254838 | 9/2003 |
| JP | 2003279760 | 10/2003 |
| JP | 2005147900 | 6/2005 |
| JP | 2007225894 | 9/2007 |
| JP | 2007255894 A | 10/2007 |
| JP | 2003254838 A | 9/2010 |
| JP | 2011007689 | 1/2011 |
| JP | 2012122751 | 6/2012 |
| JP | 2012225744 | 11/2012 |

\* cited by examiner

FBG SENSOR FOR MEASURING MAXIMUM STRAIN, MANUFACTURING METHOD AND USING METHOD

TECHNICAL FIELD

The present invention relates to an FBG sensor and, more particularly, to an FBG sensor capable of measuring a maximum strain of the object to be measured, a method of manufacturing the sensor, and a method of using the sensor.

BACKGROUND ART

In general, a fiber Bragg grating (FBG) sensor refers to a sensor using the reflection, refraction, diffraction, and transmission phenomena of light by transmitting light through an optical fiber. In such an FBG sensor, ultraviolet rays are selectively radiated to a glass optical fiber so that a pattern whose refractive index is periodically changed finely is formed in the length direction of the optical fiber.

Such an FBG sensor is characterized in that it has a low insertion loss because it can be formed as a filter within an optical fiber. Furthermore, the FBG sensor has a very low manufacturing cost in the case of mass production, and the bandwidth of the filter can be very small in size.

Other characteristics of the FBG sensor include that the FBG sensor is suitable for burial type measuring (durability) because it has a low possibility that it may be deteriorated due to corrosion and that an abnormal value is not generated due to moisture (reliability) because an optical signal is used. There is no influence, such as an electric field at a measuring place because an optical signal is transmitted to a measuring device. In particular, the FBG sensor is easy in a high voltage power environment (anti-noise), can be freely used around the inflammables because an electrical signal and electricity are not used (an anti-explosion property), can be easily used in long tunnels and large-scale structures because an optical signal has a very low transmission loss and can be measured in a range of several kilometers (applicability), can be used from an extremely low temperature (−270 degrees) to an extremely high temperature (several hundreds of degrees), and can be used in high temperature humidity and an extremely low temperature and high temperature (a temperature property). In particular, an FBG optical fiber sensor can measure stress within concrete like an existing electricity type measuring device and has very high economy because it can maintain a measuring function for more than 1 year even in a severe environment.

Such an FBG sensor includes a time division multiplexing (TDM) method using a time difference and a wave division multiplexing (WDM) method using a difference between waveforms. In the time division multiplexing method, a simple measuring system can be constructed because a maximum of 100 FBG sensors can be disposed in series in a single optical fiber. In contrast, the wave division multiplexing method is a method for identifying FBG in a higher layer of a reflection wavelength unique to FBG and can perform long-distance measuring.

Recently, the FBG sensor has been developed in a structural health monitoring (SHM) field, such as strain measuring, crack diagnosis, heat measuring, and pressure monitoring. The reason for this is that the FBG sensor has excellent advantages of an anti-electromagnetic property, a small size, corrosion resistant, and sensor multiplicity for a single fiber as described above. Furthermore, the FBG sensor may be used to measure parameters which significantly appear with respect to a change of a strain or temperature.

Conventional remote communication optical fibers include silica glass fibers coated in 2 to 3 polymer layers. The reason for this is that a coatless optical fiber is likely to be broken. A silica fiber coated with polymer provides high stiffness for a short period. If such fibers are subjected to stress in a wet environment, however, strength is reduced over a long time because a crack grows very slowly. In order to protect a silica glass fiber from the penetration of moisture, the coating of metal, such as aluminum, indium, tin, antimony, zinc, lead, copper, nickel, or gold, is performed on the optical fiber. Some of the fibers showed higher resistance against the penetration of moisture. Furthermore, some of the fibers showed higher stiffness compared to a polymer coating fiber. Some of the fibers can withstand a relatively higher temperature. Meanwhile, an optical fiber is coated in order to increase mechanical properties, such as Young's Modulus, the coefficient of thermal expansion, and a Poisson's ratio, to improve reliability, and to protect the optical fiber against a severe environment. Although such a technology for coating an optical fiber improves the characteristics of the optical fiber, but a technology for detecting a maximum strain of the object to be measured using the residual strain of a coated material has not been performed.

DISCLOSURE

Technical Problem

Accordingly, the present invention has been made keeping in mind the above problems occurring in the prior art, and an object of the present invention is to provide an FBG sensor for measuring a maximum strain, which is capable of measuring a maximum strain of the object to be measured structure using a residual strain, a method of manufacturing the FBG sensor, and a method of using the FBG sensor.

Technical objects to be achieved by the present invention are not limited to the aforementioned object, and those skilled in the art to which the present invention pertains may evidently understand other technical objects from the following description.

Technical Solution

The object of the present invention may be achieved by an FBG sensor for measuring a maximum strain, including an optical fiber 130 having an FBG sensor 150 provided therein; a first metal foil 100 having the optical fiber 130 come in contact with one surface thereof; a second metal foil 120 having surface contact with the one surface; an adhesive layer 140 provided between the first and the second metal foils 100 and 120; means for measuring residual strains of the first and the second metal foils 100 and 120 through the FBG sensor 150; and means for calculating a maximum strain based on the measured residual strain value and a sensitivity coefficient Csen calculated through experiments.

Furthermore, at least one of the first and the second metal foils 100 and 120 may be one of an aluminum foil, a steel foil, and a copper foil. Furthermore, at least one of the first and the second metal foils 100 and 120 has a thickness ranging from 10 μm to 30 μm. At least one of the first and the second metal foils 100 and 120 is preferably a rectangle in a length direction of the optical fiber 130. Furthermore, the optical fiber 130 is placed on the center line of at least one of the first and the second metal foils 100 and 120.

Furthermore, the FBG sensor preferably further includes a bracket for connecting one surface of any one of the first and the second metal foils 100 and 120 and an object to be measured. Furthermore, the bracket more preferably includes a pair of brackets 160a and 160b symmetrically placed based on the FBG sensor 150.

The object of the present invention may be achieved by a method of manufacturing an FBG sensor for measuring a maximum strain, including steps of forming an adhesive layer 140 by coating adhesives on one surface of a first metal foil 100 (S100); bonding an optical fiber 130 comprising the FBG sensor 150 to the adhesives (S200); and bonding a second metal foil 120 to the one surface of the first metal foil 100 (S300), as another category.

Furthermore, the method preferably further includes the step (S400) of cutting the first and the second metal foils 100 and 120 in a required form.

The object of the present invention may be achieved by a method of using an FBG sensor for measuring a maximum strain, including steps of attaching the FBG sensor, fabricated by steps of forming an adhesive layer 140 by coating adhesives on one surface of a first metal foil 100 (S100), bonding an optical fiber 130 comprising the FBG sensor 150 to the adhesives (S200), bonding a second metal foil 120 to the one surface of the first metal foil 100 (S300); and cutting the first and the second metal foils 100 and 120 in a required form (S400), to an object to be measured; inputting a specific input signal to the optical fiber 130 while the object to be measured is deformed or after the object to be measured is deformed; measuring an output signal of the FBG sensor 150 based on the input signal; measuring a residual strain of the object to be measured based on the output signal; and a maximum strain using the measured residual strain value and a sensitivity coefficient Csen calculated through experiments, as yet another category.

Advantageous Effects

In accordance with an embodiment of the present invention, the characteristics (anti-electromagnetic property, a small size, corrosion resistant, etc.) of an FBG sensor can be maintained, and a maximum strain of the object to be measured can also be measured. Accordingly, the present invention can be actively used in the structural health monitoring (SHM) field, such as strain measuring, crack diagnosis, heat measuring, and pressure monitoring.

Although the present invention has been described in connection with the preferred embodiments, those skilled in the art will readily appreciate that the present invention may be changed and modified in various ways without departing from the gist and scope of the present invention. It is evident that such changes and modifications fall within the scope of the appended claims.

DESCRIPTION OF DRAWINGS

The following accompanied drawings in this specification illustrate preferred embodiments of the present invention and function to facilitate further understanding of the technical spirit of the present invention along with the detailed description of the invention. Accordingly, the present invention should not be construed as being limited to only contents illustrated in the drawings.

BEST MODE

Figure 1:
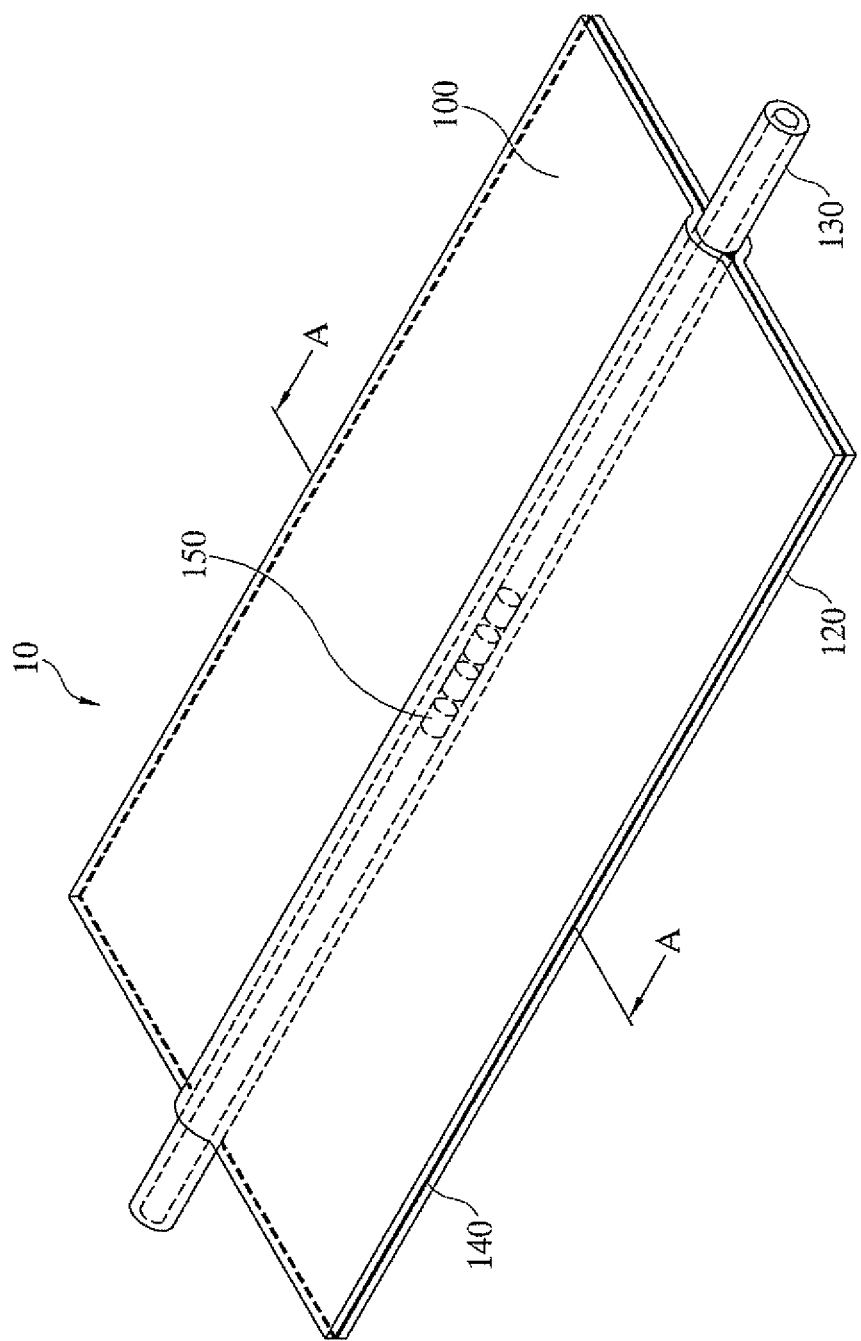
FIG. 1 is a perspective view of an FBG sensor in accordance with a first embodiment of the present invention.

An FBG sensor for measuring a maximum strain according to the present invention may include an optical fiber 130 having an FBG sensor 150 provided therein; a first metal foil 100 having the optical fiber 130 come in contact with one surface thereof; a second metal foil 120 having surface contact with the one surface; an adhesive layer 140 provided between the first and the second metal foils 100 and 120; means for measuring residual strains of the first and the second metal foils 100 and 120 through the FBG sensor 150; and means for calculating a maximum strain based on the measured residual strain value and a sensitivity coefficient Csen calculated through experiments.

In this case, the FBG sensor 150 is placed in the middle portion of the optical fiber 130. The first and the second metal foils 100 and 120 are bonded together up and down on the basis of the FBG sensor 150. The first and the second metal foils 100 and 120 and the optical fiber 130 are densely bonded together by the adhesive layer 140. When the first and the second metal foils 100 and 120 are cut in a rectangle form, the FBG sensor 150 is placed at the central position thereof.

[Mode for Invention]

Hereinafter, embodiments of the present invention are described in detail with reference to the accompanying drawings so that those skilled in the art to which the present invention pertains axe able to readily practice the present invention. In describing an operational principle relating to the preferred embodiments of the present invention, however, a detailed description of relevant functions or constructions will be omitted if it is deemed to make the gist of the present invention unnecessarily vague.

Furthermore, the same reference numerals designate elements having similar functions and operations throughout the drawings. Throughout the specification, when it is described that one element is connected to the other element, the one element may be directly connected to the other element or indirectly connected to the other element through a third element. Furthermore, when it is described that one element includes another element, it means that the one element does not exclude another element, but may include other elements, unless otherwise described.

<Configuration>

Figure 2:
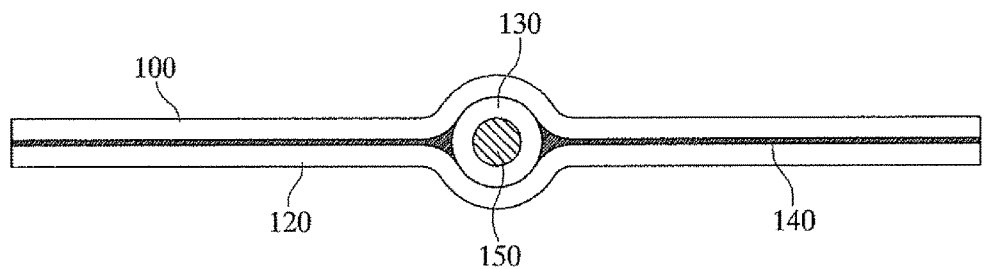
FIG. 2 is a cross-sectional view of FIG. 1 in a direction A-A.

FIG. 1 is a perspective view of an FBG sensor 10 in accordance with a first embodiment of the present invention, and FIG. 2 is a cross-sectional view of FIG. 1 in a direction A-A. As shown in FIGS. 1 and 2, an FBG sensor 150 is placed in the middle portion of an optical fiber 130. First and second metal foils 100 and 120 come in contact with the FBG sensor 150 up and down. The first and the second metal foils 100 and 120 and the optical fiber 130 are densely bonded together by an adhesive layer 140.

Each of the first and the second metal foils 100 and 120 may be an aluminum foil having a thickness ranging from 10 μm to 30 μm. More preferably, each of the first and the second metal foils 100 and 120 may have a thickness ranging from 15 μm to 20 W. If the thickness is less than 10 μm, the metal foil is torn when being handled or it is difficult to manufacture the metal foil. If the thickness is greater than 30 μm, it may be difficult to accurately measure the residual strain of the metal foil because an elastic restoring force is increased. In the present embodiment, an aluminum foil having a thickness of about 18 μm was used in each of the first and the second metal foils 100 and 120. Accordingly, a total thickness of the first and the second metal foils 100 and 120 and the adhesive layer 140 is about 36 μm. In the present embodiment, a steel foil, a copper foil or the like may be used instead of the aluminum foil.

When the first and the second metal foils 100 and 120 are cut in a rectangle form, the FBG sensor 150 is placed at the central position of the first and the second metal foils 100 and 120.

A product, cyano-acrylate base CC-33A of KYOWA, was used as adhesives used in the adhesive layer 140.

Figure 3:
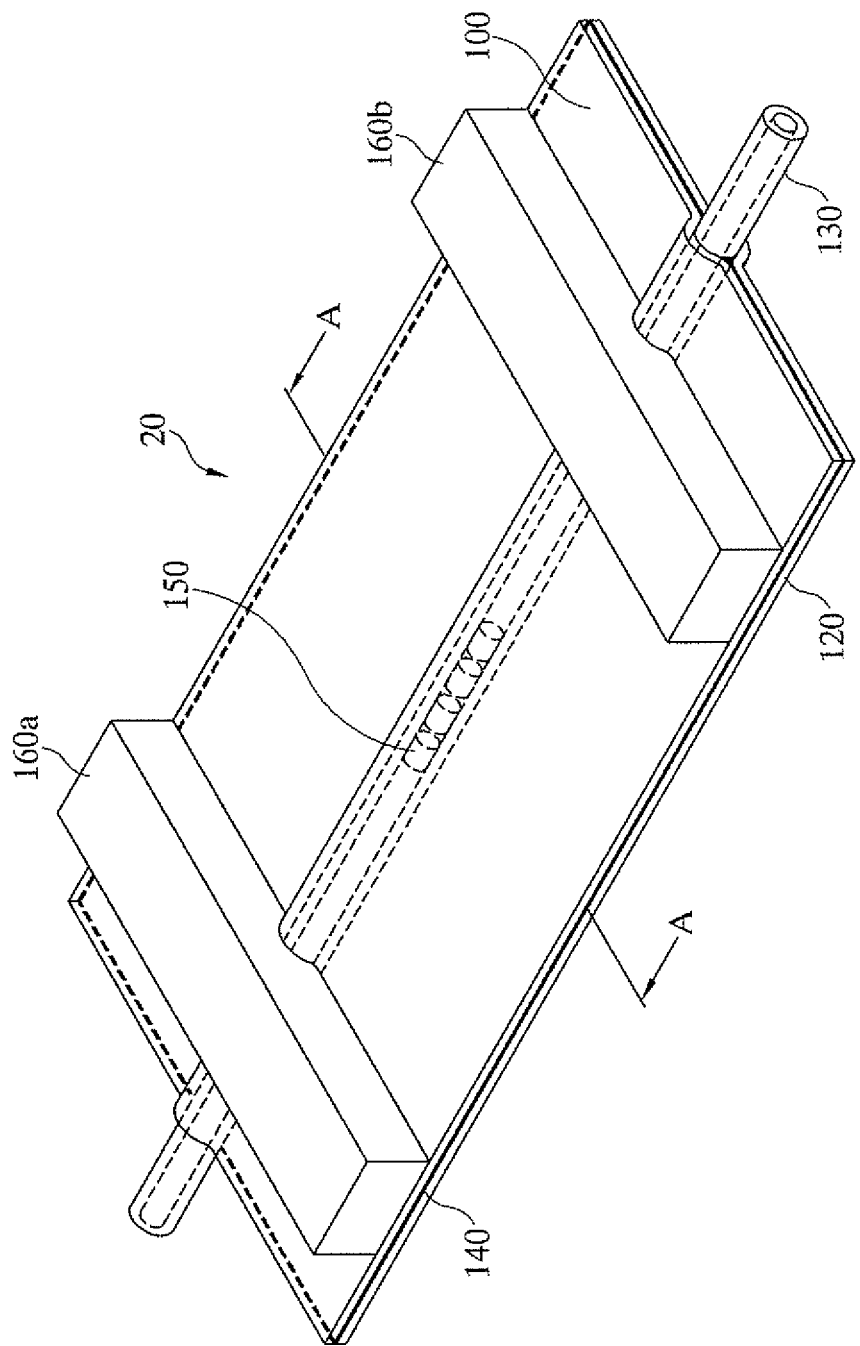
FIG. 3 is a perspective view of an FBG sensor in accordance with a second embodiment of the present invention.

FIG. 3 is a perspective view of an FBG sensor 20 in accordance with a second embodiment of the present invention. As shown in FIG. 3, the first and the second metal foils 100 and 120, the adhesive layer 140, the optical fiber 130, the FBG sensor 150, etc. are the same as those of the first embodiment, and a description of the elements is omitted.

Brackets 160a and 160b function to bond the first metal foil 100 and the object 200 to be measured. The brackets 160a and 160b are symmetrically disposed at positions spaced apart from each other about 2.5 cm on the basis of the FBG sensor 150. Actually, the brackets 160a and 160b may be epoxy resin (KFR-730F resin: KFR-730F hardener=a ratio of 100:37) that is thickly coated and hardened. Accordingly, stress and a strain of the object 200 to be measured is delivered to the sensor through the brackets 160a and 160b.

<Manufacturing Method>

Figure 7:
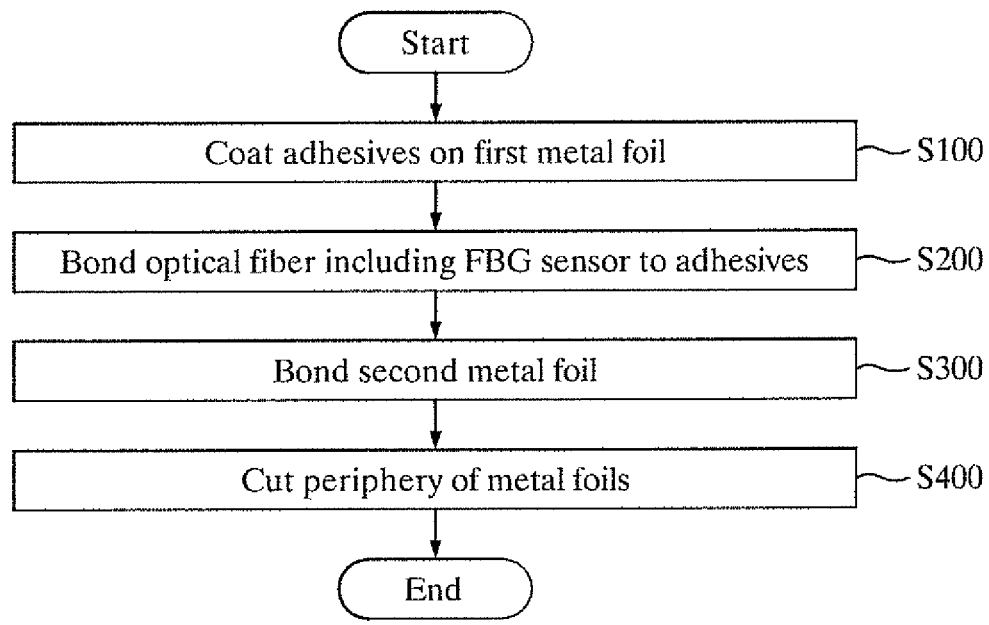
FIG. 7 is a flowchart illustrating a method of manufacturing the FBG sensor in accordance with an embodiment of the present invention.

A manufacturing method of the first and the second embodiments having the above constructions is described in detail below with reference to the accompanying drawings. FIG. 7 is a flowchart illustrating a method of manufacturing the FBG sensor in accordance with an embodiment of the present invention. As shown in FIG. 7, there are prepared an aluminum foil (the first metal foil 100) having a thickness of about 18 μm which is easily obtained in our lives and the optical fiber 130 in which the FBG sensor 150 of about 1 cm in length has been embedded. Thereafter, the adhesive layer 140 is formed by coating adhesives on one surface of the aluminum foil (the first metal foil 100) (S100).

Thereafter, the optical fiber 130 is bonded to the adhesive layer 140 so that the FBG sensor 150 is placed at the center (S200).

Thereafter, the same aluminum foil (the second metal foil 120) as the aluminum foil (the first metal foil 100) is covered and bonded to the aluminum foil (the first metal foil 100) (S300). A sheet of a large aluminum foil may be folded using a modified manufacturing method, thereby being capable of completing step S300.

Thereafter, the periphery of the aluminum foils (the first and the second metal foils 100 and 120) is cut in a required size and form (e.g., a rectangle) and completed (S400). In this case, the optical fiber 130 is preferably placed on the center line of the aluminum foils that are symmetrical to each other left and right.

In addition, step for bonding the brackets 160a and 160b as in the second embodiment shown in FIG. 3 may be added, if necessary. The pair of brackets 160a and 160b is bonded at positions spaced apart from each other left and right about 2.5 cm on the basis of the center thereof using epoxy resin. The manufacturing method of the FBG sensor 10, 20 according to the present invention is completed through such steps.

<Use Method>

A use method for measuring a maximum strain using the first and the second embodiments is described in detail below with reference to the accompanying drawings. First, a sensitivity coefficient Csen between a maximum strain and a residual strain is defined as follows.

$$C_{sen} = \frac{e_{max}}{e_{res}} \quad \text{[Equation 1]}$$

In Equation 1, $e_{max}$ is a maximum strain, and $e_{res}$ is a residual strain. Thereafter, after the FBG sensor according to the present invention and a strain gauge are attached to a specific sample, a tensile test is performed in a tensile tester. The sensitivity coefficient Csen is calculated from [Equation 1] using the maximum strain $e_{max}$ of the strain gauge measured at this time and the residual strain $e_{max}$ of the FBG sensor measured after the tensile test. Thereafter, when a structure to be measured is attached to the FBG sensor and the residual strain $e_{res}$ is measured, the maximum strain $e_{max}$ can be obtained from [Equation 1] using the previously calculated sensitivity coefficient Csen.

Figure 4:
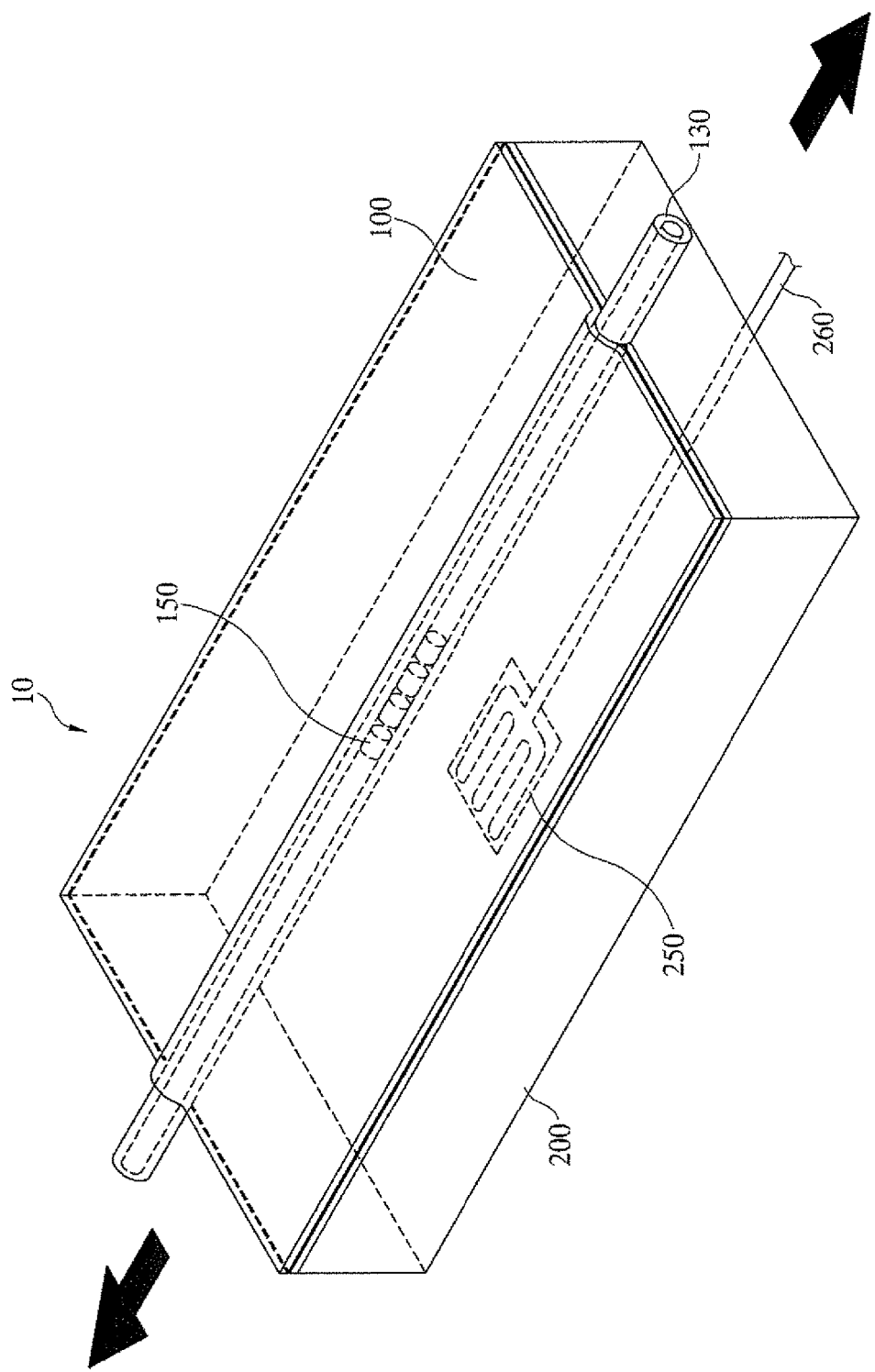
FIG. 4 is a use state diagram schematically showing the state in which the first embodiment shown in FIG. 1 is attached to a CFRP 200, that is, a sample, and maximum strains and residual strains are measured.
Figure 5:
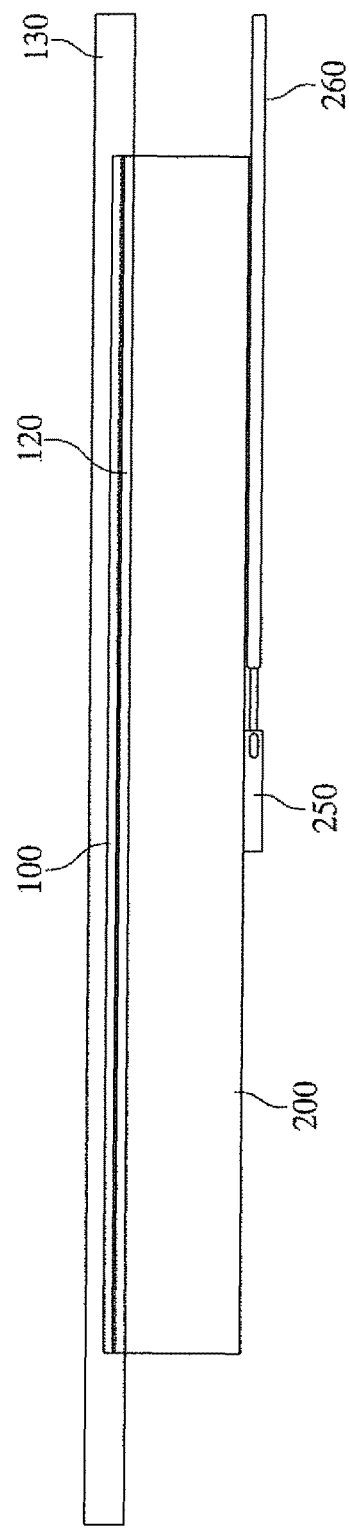
FIG. 5 is a side view of FIG. 4.

FIG. 4 is a use state diagram schematically showing the state in which the first embodiment shown in FIG. 1 is attached to a CFRP 200, that is, a sample, and maximum strains and residual strains are measured, and FIG. 5 is a side view of FIG. 4. As shown in FIGS. 4 and 5, carbon fiber-reinforced polymer (CFRP), that is, a specific sample 200 whose sensitivity coefficient Csen was to be calculated, was prepared. The carbon fiber-reinforced polymer (CFRP) is used as a major structural material in almost all of commercialized modern airplanes. In order to monitor the health state of a complex material, such as CFRP, it is very important to detect a maximum strain. The reason for this is that a structure safety criterion can be determined based on such information. The dimensions of the carbon fiber-reinforced polymer (CFRP) complex sample 200 were 2 mm in thickness, 25 mm in width, and 150 mm in length. The FBG sensor 10 to which the aluminum foils had been bonded was attached to a top surface of the CFRP sample 200 using epoxy resin, and an electricity strain gauge 250 of 5 mm in length was attached to a bottom surface of the CFRP sample 200. A signal from the strain gauge 250 was output through separate wiring 260.

The sample 200 prepared as shown in FIGS. 4 and 5 was mounted on a universal test machine (UTM) capable of control so that a load of a maximum of 5 tons and deformation could be applied, and a tensile force was applied in the arrow direction of FIG. 4. During the tensile test, the data of the FBG sensor 10 according to the present invention was obtained by an FBG interrogator CyTroniQ, and the data of the strain gauge 250 was obtained by a signal controller (not shown) through an A/D transmitter (not shown). As a detailed experiment method, a strain was repeatedly measured ten times for each load step. Each step was 100 Kbf, and an increase of each load to the FBG sensor 10 on the sample 200 and the removal of the strain were repeated.

Figure 6:
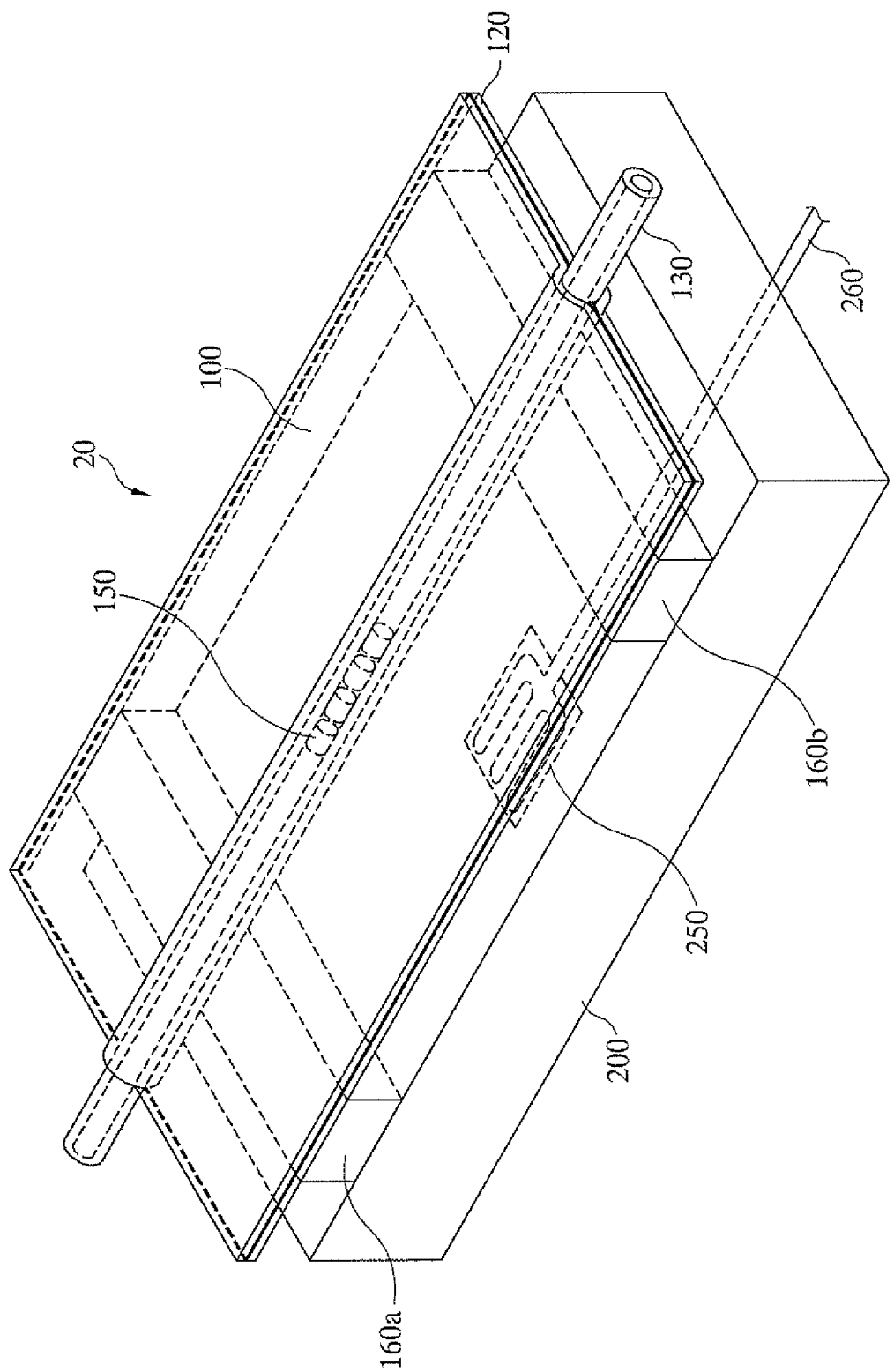
FIG. 6 is a use state diagram schematically showing the state in which the second embodiment shown in FIG. 3 is attached to the CFRP 200, that is, a sample, and maximum strains and residual strains are measured.

FIG. 6 is a use state diagram schematically showing the state in which the second embodiment shown in FIG. 3 is attached to the CFRP 200, that is, a sample, and maximum strains and residual strains are measured.

Figure 8:
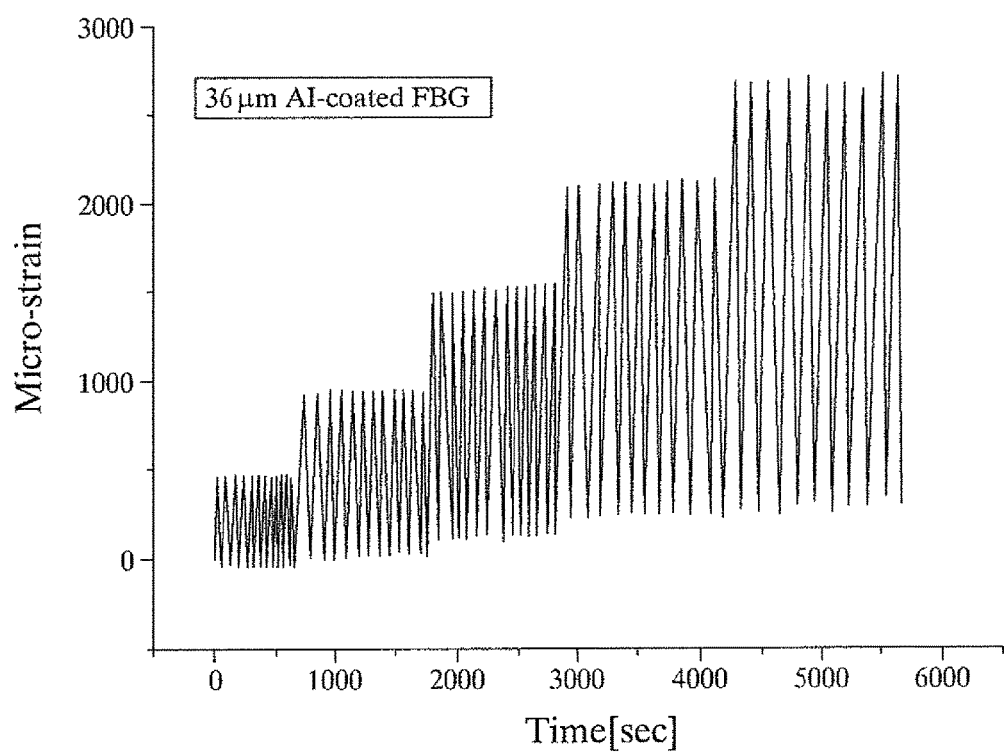
FIG. 8 is a graph of the measurement of maximum strains using the first embodiment of the present invention.
Figure 9:
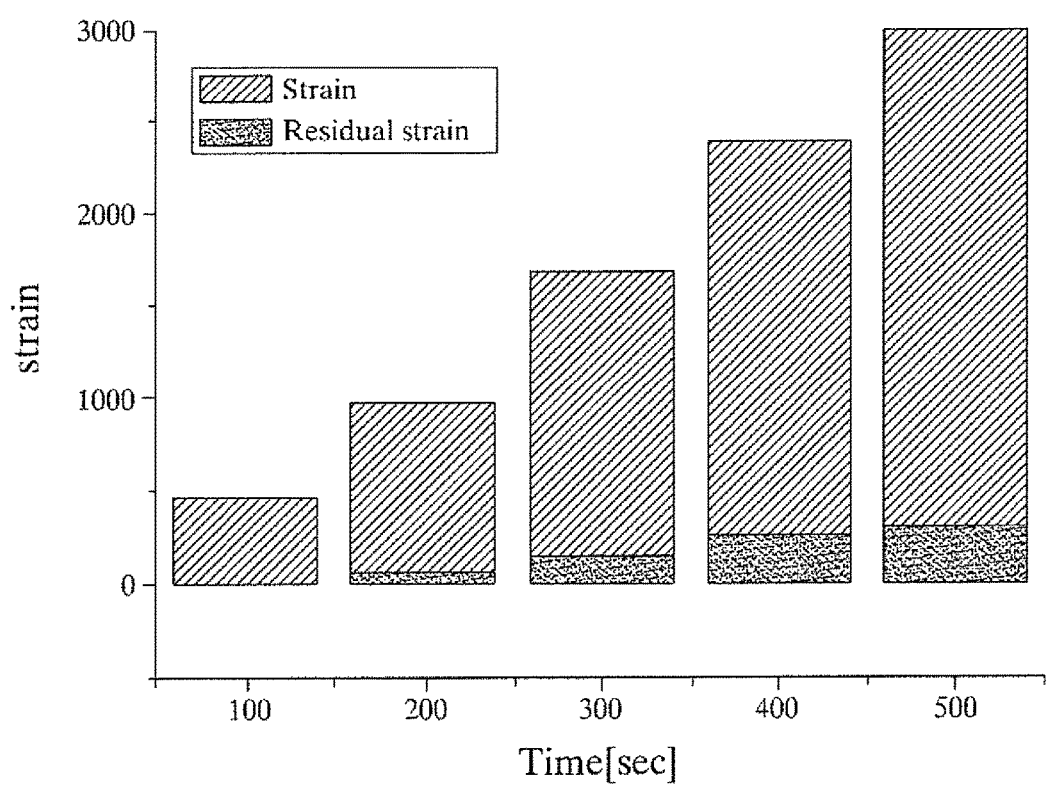
FIG. 9 is a graph of the measurement of strains and residual strains using the first embodiment of the present invention.
Figure 10:
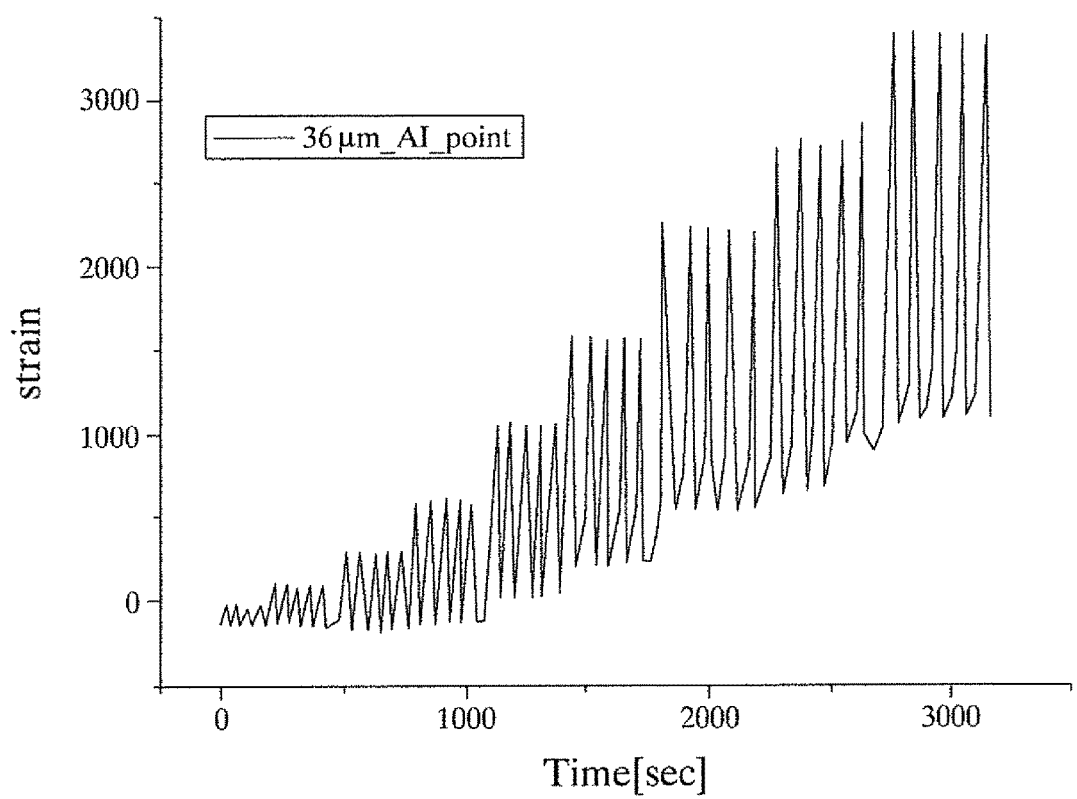
FIG. 10 is a graph of the measurement of a maximum strain using the second embodiment of the present invention.
Figure 11:
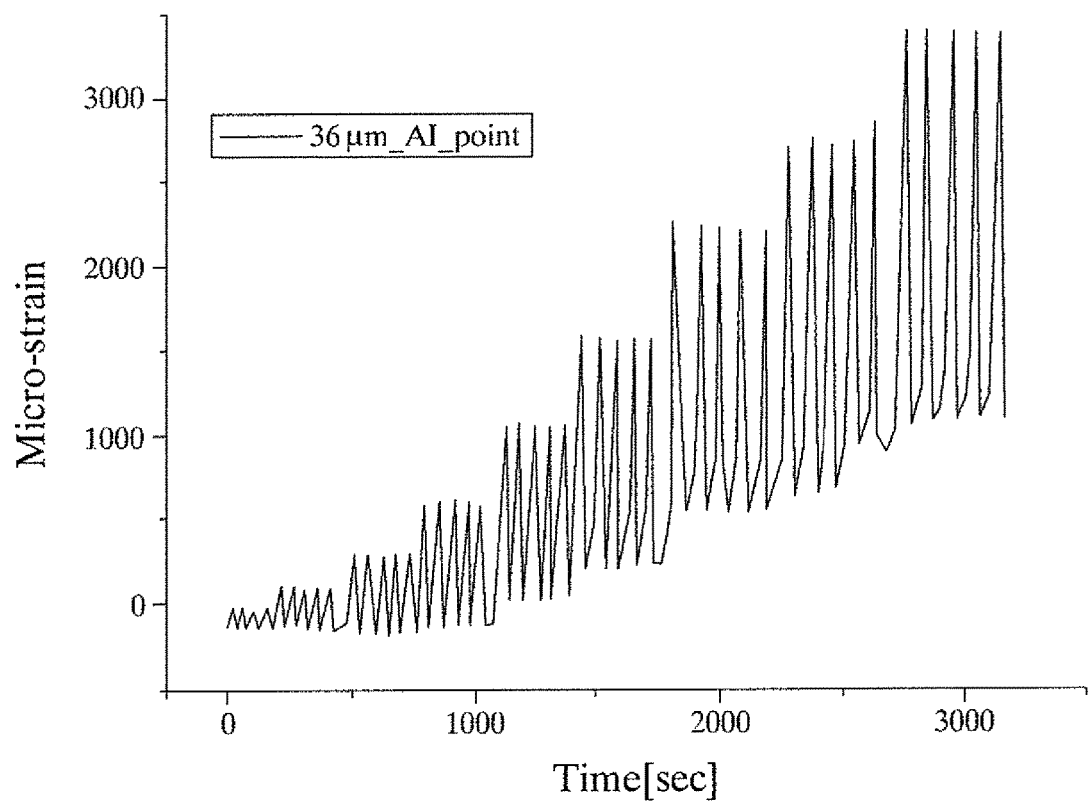
FIG. 11 is a graph of the measurement of strains and residual strains using the second embodiment of the present invention.

Graphs of maximum strains and residual strains for the first and the second embodiments are shown in FIGS. 8-11 using such a method. That is, FIG. 8 is a graph of the measurement of maximum strains using the first embodiment of the present invention, FIG. 9 is a graph of the measurement of strains and residual strains using the first embodiment of the present invention, FIG. 10 is a graph of the measurement of a maximum strain using the second embodiment of the present invention, and FIG. 11 is a graph of the measurement of strains and residual strains using the second embodiment of the present invention. For reference, no residual strain could be obtained from the FBG sensor not having a metal foil.

As may be seen from FIGS. 8 and 9, residual strains remained from the second step of the applied tensile force. Whenever the tensile force was increased, the results in which the residual strain was linearly increased were obtained. That is, the slopes of the maximum strain $e_{max}$ and the residual strain $e_{res}$ were 5.64 and 0.87, respectively. In accordance with [Equation 1], the sensitivity coefficient Csen was calculated as about 6.48. The sensitivity coefficient Csen could be calculated through such a process.

Thereafter, the FBG sensor 10 according to the present invention was attached to the object to be actually measured, and the residual strain $e_{res}$ of the object was calculated. The maximum strain $e_{max}$ could be calculated from [Equation 1] using the measured residual strain $e_{res}$ and the sensitivity coefficient Csen calculated through the process.

As may be seen from FIGS. 10 and 11, a strain was repeatedly measured five times for each step. When the tensile force was applied to the sample 200, the residual strain was measured from the fourth step. The strains showed linearity as in FIGS. 8 and 9. The slopes of a maximum strain $e_{max}$ and residual strain $e_{res}$ measured using the same method as that performed in the experiment of FIGS. 8 and 9 were 2.69 and 0.319, respectively. Accordingly, in accordance with [Equation 1], a sensitivity coefficient Csen was calculated as about 8.43.

A difference between the results of the first embodiment of FIGS. 8 and 9 and the results of the second embodiment of FIGS. 10 and 11 is a ratio between the strain and tensile force steps. As expected, the sensitivity coefficient Csen 6.48 in the first embodiment (FIGS. 8 and 9) is smaller than the sensitivity coefficient Csen 8.43 in the second embodiment (FIGS. 10 and 11). This may be considered to be related to the distance between the FBG sensor and the sample 200. That is, in the case of the first embodiment (FIGS. 8 and 9), the sensitivity coefficient Csen is small because the distance between the FBG sensor and the sample 200 is close. In the case of the second embodiment (FIGS. 10 and 11), the sensitivity coefficient Csen is great because the distance between the FBG sensor and the sample 200 is distant.

Furthermore, the residual strain $e_{res}$ in the first embodiment (FIGS. 8 and 9) is 0.87 and the residual strain $e_{res}$ in the second embodiment (FIGS. 10 and 11) is 0.319, and there is a difference of more than twice. Accordingly, the FBG sensors of the first and the second embodiments may be properly applied and used depending on a distribution sensing field, the large and small of a residual strain, and the large and small of a sensitivity coefficient.

The FBG sensor described as above is not limited and applied to the configurations and methods of the aforementioned embodiments, but some or all of the embodiments may be selectively combined and configured so that the embodiments are modified in various ways.

The invention claimed is:

1. An FBG sensor for measuring a maximum strain, comprising:
    an optical fiber having an FBG sensor provided therein;
    a first metal foil having the optical fiber come in contact with one surface thereof;
    a second metal foil having surface contact with the one surface;
    an adhesive layer provided between the first and the second metal foils;
    means for measuring residual strains of the first and the second metal foils through the FBG sensor; and
    means for calculating a maximum strain based on the measured residual strain value and a sensitivity coefficient calculated through experiments.

2. The FBG sensor of claim 1, wherein at least one of the first and the second metal foils comprises an aluminum foil.

3. The FBG sensor of claim 1, wherein at least one of the first and the second metal foils has a thickness ranging from 10 μm to 30 μm.

4. The FBG sensor of claim 1, wherein at least one of the first and the second metal foils is a rectangle in a length direction of the optical fiber.

5. The FBG sensor of claim 1, wherein the optical fiber is placed on a center line of at least one of the first and the second metal foils.

6. The FBG sensor of claim 1, further comprising a bracket for connecting one surface of any one of the first and the second metal foils and an object to be measured.

7. The FBG sensor of claim 6, wherein the bracket comprises a pair of brackets symmetrically placed based on the FBG sensor.

8. A method of manufacturing an FBG sensor for measuring a maximum strain, the method comprising:
    forming an adhesive layer by coating adhesives on one surface of a first metal foil;
    bonding an optical fiber comprising the FBG sensor to the adhesives; and
    bonding a second metal foil to the one surface of the first metal foil.

9. The method of claim 8, further comprising a step of cutting the first and the second metal foils in a required form.

10. A method of using an FBG sensor for measuring a maximum strain, the method comprising steps of:
    attaching the FBG sensor, fabricated by steps of forming an adhesive layer by coating adhesives on one surface of a first metal foil, bonding an optical fiber comprising the FBG sensor to the adhesives, bonding a second metal foil to the one surface of the first metal foil; and cutting the first and the second metal foils in a required form, to an object to be measured;
    inputting a specific input signal to the optical fiber while the object to be measured is deformed or after the object to be measured is deformed;
    measuring an output signal of the FBG sensor based on the input signal;

measuring a residual strain of the object to be measured based on the output signal; and a maximum strain using the measured residual strain value and a sensitivity coefficient calculated through experiments.

* * * * *